(No Model.) 3 Sheets—Sheet 1.
D. J. HADLEY.
DEVICE FOR HEATING WATERING TROUGHS.
No. 394,689. Patented Dec. 18, 1888.
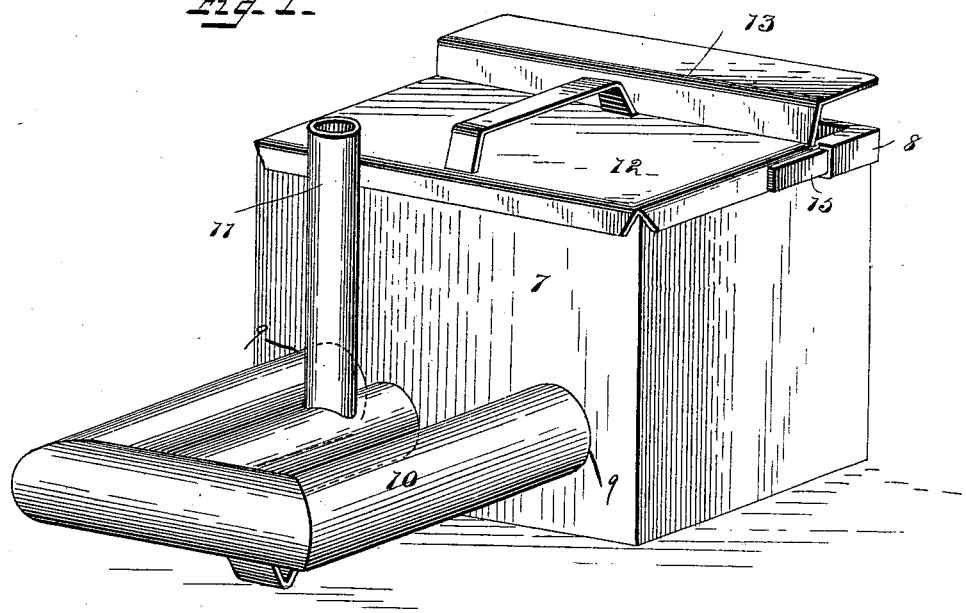
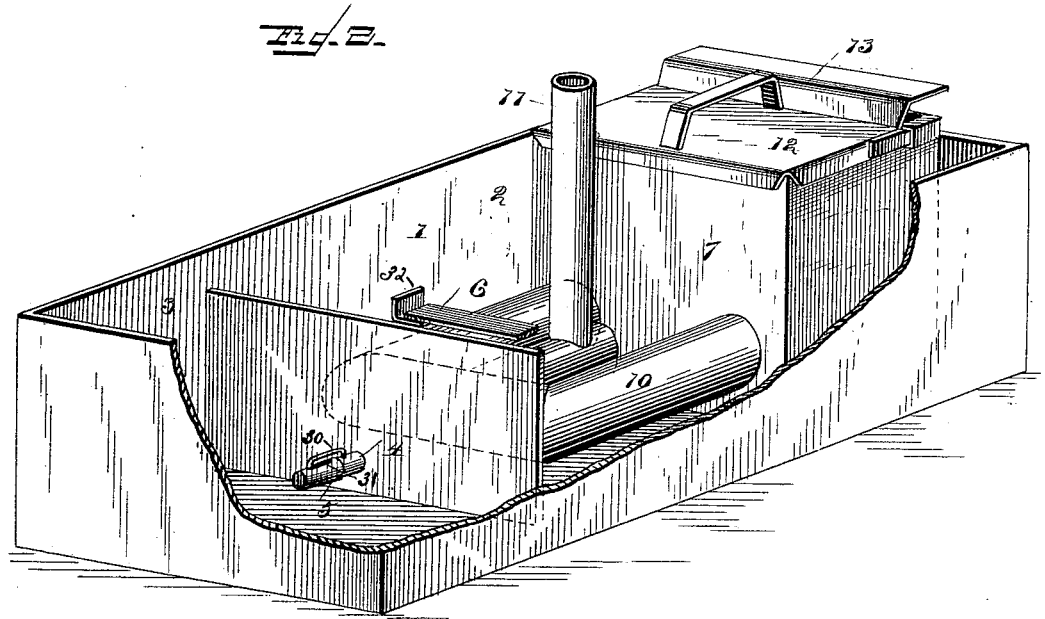
WITNESSES
F. L. Ourand
A. L. Morsell.
INVENTOR
Dennis J. Hadley,
By Chas. E. Fairman,
His Attorney.

(No Model.) 3 Sheets—Sheet 2.
D. J. HADLEY.
DEVICE FOR HEATING WATERING TROUGHS.
No. 394,689. Patented Dec. 18, 1888.
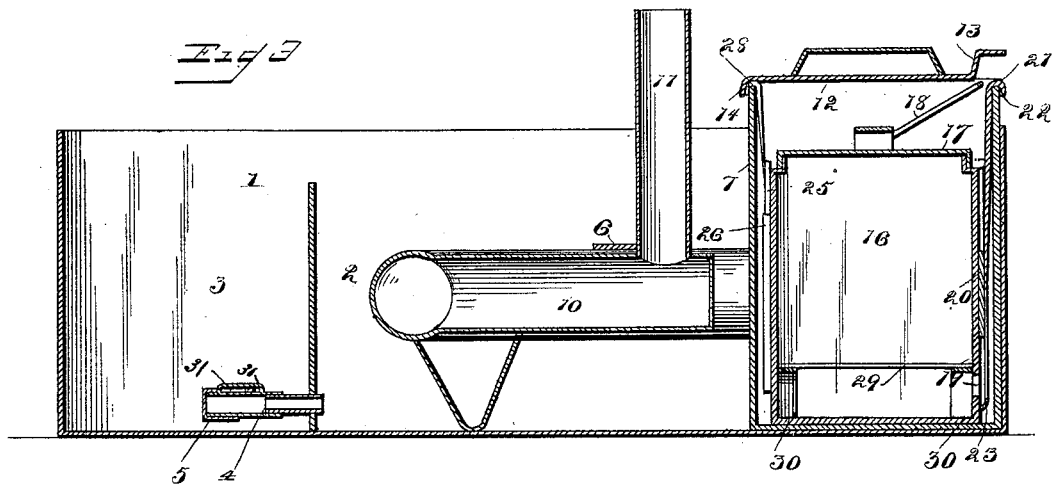
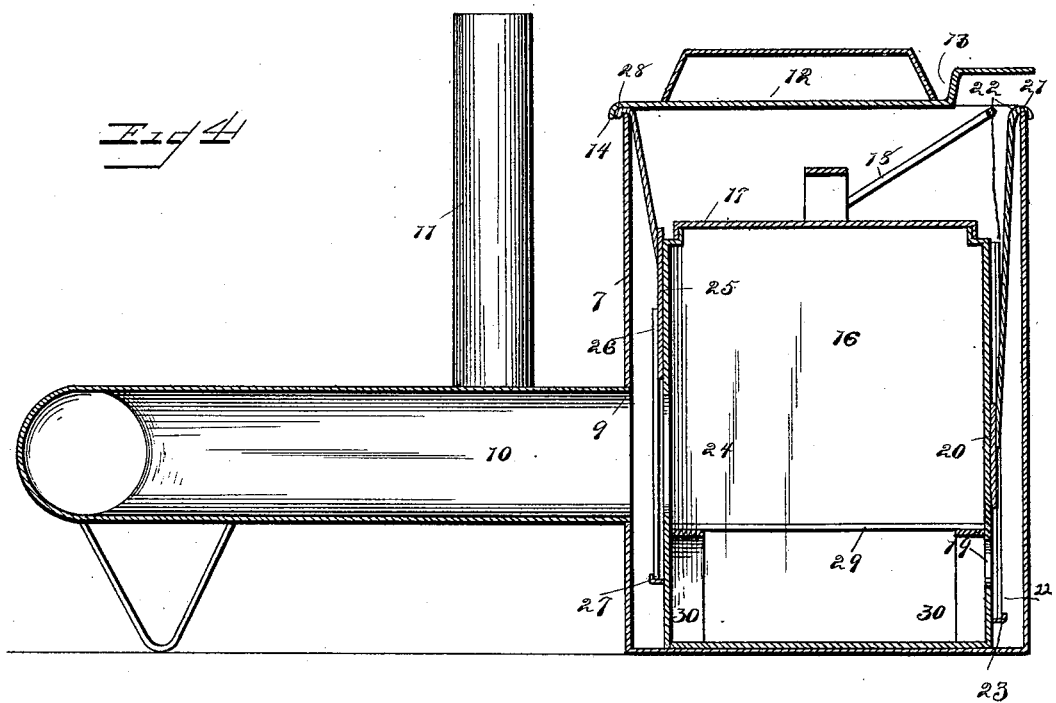
WITNESSES
F. L. Ourand
A. L. Morrell.
INVENTOR
Dennis J. Hadley,
By Chas. E. Fauman,
His Attorney (No Model.) 3 Sheets—Sheet 3.
D. J. HADLEY.
DEVICE FOR HEATING WATERING TROUGHS.
No. 394,689. Patented Dec. 18, 1888.
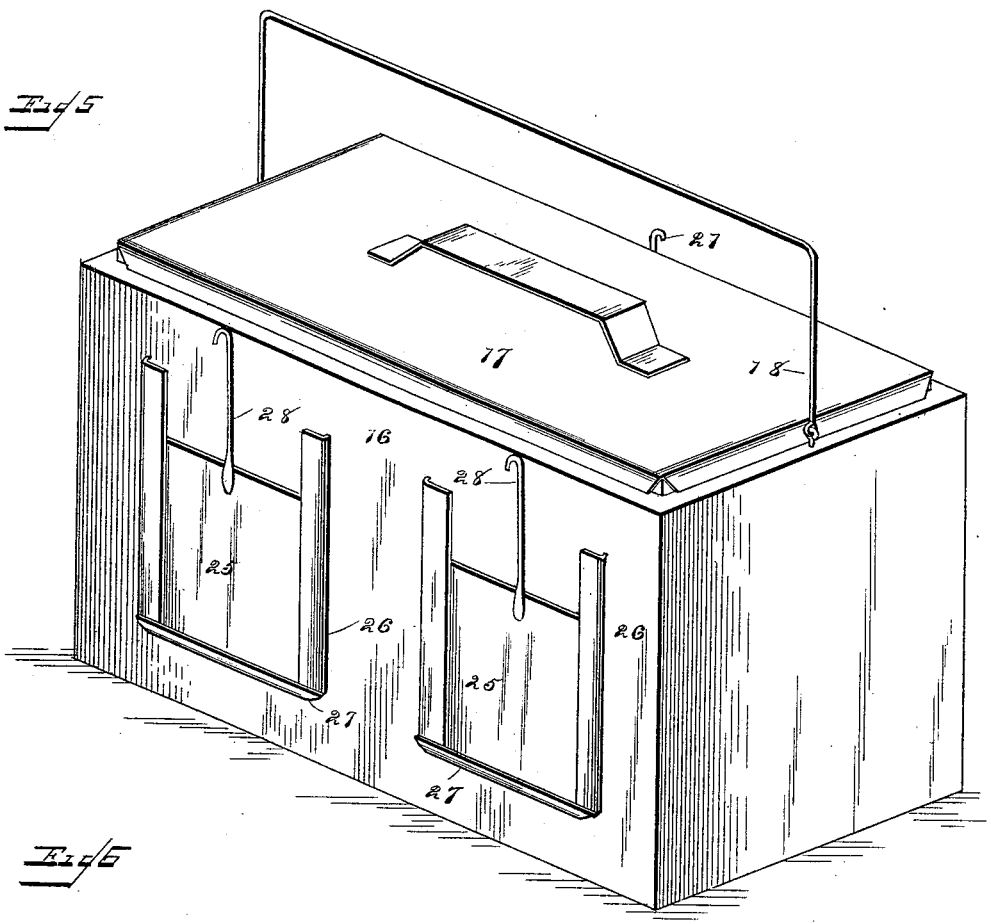
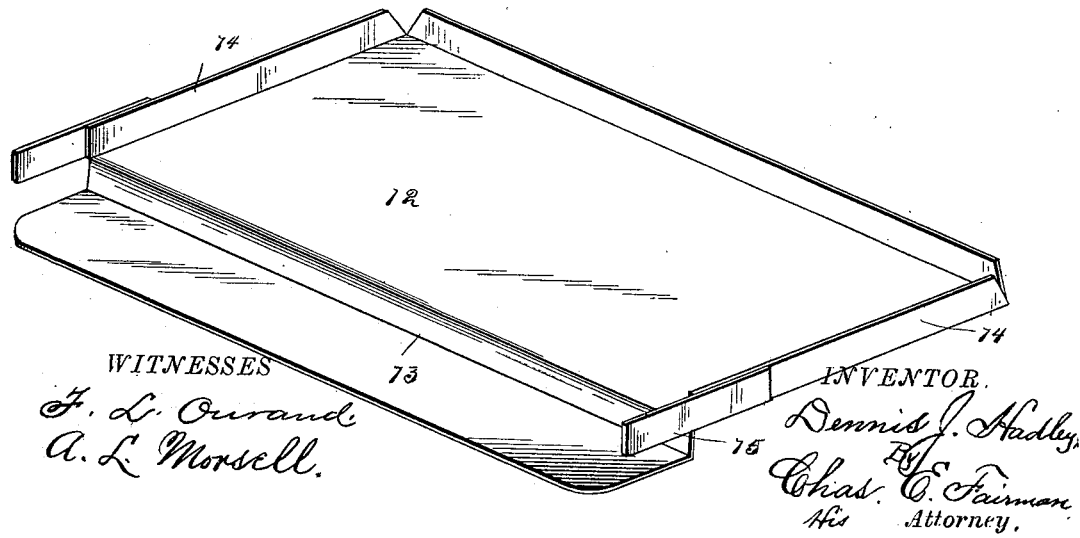
WITNESSES
F. L. Ourand
A. L. Morsell.
INVENTOR.
Dennis J. Hadley,
By Chas. C. Fairman
His Attorney.

UNITED STATES PATENT OFFICE.

DENNIS JOHN HADLEY, OF EAST FAIRFIELD, VERMONT.

DEVICE FOR HEATING WATERING-TROUGHS.

SPECIFICATION forming part of Letters Patent No. 394,689, dated December 18, 1888.

Application filed October 24, 1887. Serial No. 253,201. (No model.)

*To all whom it may concern:*

Be it known that I, DENNIS JOHN HADLEY, a citizen of the United States, residing at East Fairfield, in the county of Franklin and State of Vermont, have invented certain new and useful Improvements in Devices for Heating Watering-Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a perspective view of my improved device for heating watering-troughs. Fig. 2 is a similar view showing the heater applied to a trough or receptacle for holding water. Fig. 3 is a longitudinal vertical sectional view taken through the center of the device. Fig. 4 is a longitudinal vertical section of the heating device proper, removed from the trough, taken through the side heating-pipe, part being shown in elevation. Fig. 5 is a detail view of the fire-box, and Fig. 6 is a bottom view of the cover of the outer casing or chamber.

Similar numerals of reference indicate corresponding parts throughout the several views.

My invention has relation to improvements in devices for heating troughs or tubs for watering stock, the object of the same being to provide a device whereby the water contained within the trough or vessel is prevented from freezing or congealing in cold weather, the same being attained by the peculiar construction and combination of parts of the same, as hereinafter more fully described and pointed out.

Referring to the drawings by their designating-numerals, the numeral 1 indicates the trough or receptacle for holding the water, and within which, also, the heating device is placed. This trough or receptacle consists of two compartments, 2 3, a faucet or discharge-pipe, 4, having a cap, 5, being adapted to transfer or draw the water from the heating-compartment to the drinking chamber or receptacle. The discharge-pipe 4 is provided on its top with a bail, 30, which engages a longitudinal slot, 31, in cap 5, whereby the same is secured to said faucet or discharge-pipe. The heating-apartment 2 is also provided with a cross-bar, 6, for retaining the heater in proper position therein, said cross-bar being soldered or otherwise suitably secured to angle-flanges 32 32, secured to each side of the trough or receptacle 1, as shown in Fig. 2 of the drawings.

7 represents the outer chamber or casing, having at two of its corners perforated lugs or sleeves 8 8, and also provided with side perforations, 9 9, with which a suitable system of heating-pipes, 10, are connected, said pipes communicating with a vertical or perpendicular exit pipe or vent, 11.

12 is the cover of the outer chamber or casing, which is provided with an upper angular flange, 13, and also with downwardly-extending side flanges, 14 14, to admit of the cover fitting neatly over the top of the outer casing. These flanges 14 14 are provided with extended ends 15 15, which pass into the perforated lugs or sleeves 8 8 of the outer chamber or casing. It will be seen that by this arrangement the cover is effectually secured to the top of the outer chamber or casing, while a space is left for draft purposes by the peculiar construction of the upper or right-angled flange, 13, which also protects the interior fire-box from inclement weather.

16 is the fire-box, provided with a suitable top or cover, 17, and also provided with a handle or bail, 18, for readily removing it from the outer chamber or casing. Upon one side of this fire-box is arranged a series of perforations, 19. An elongated plate or damper, 20, having an operating-rod, 21, provided with a bent or hooked end, works in ways or grooves 22, and is supported in its lower position by a transverse flange, 23. When the fire-box is lowered into the outer casing or chamber, 7, the bent ends of the operating-rods engage the upper edges of the outer casing or chamber, thereby raising the dampers, thus leaving the perforations or holes free for the entrance of air, and, vice versa, when the fire-box is removed from the outer casing or chamber the operating-rods are released from engagement and the dampers by their own gravity fall back into place, closing the draft-perforations.

Upon the reverse side of the fire-box are arranged perforations 24 24, registering with the side perforations of the outer casing, the opening and closing of said perforations being regulated by suitable dampers, 25 25, working in vertical ways or grooves 26 26, and supported by bottom flanges, 27 27, also provided with vertical operating-rods 28 28, having hooked or bent ends, said dampers being operated in like manner as the damper upon the opposite side of the fire-box.

Upon the bottom of the fire-box is a removable grate, 29, supported by suitable uprights or standards, 30, at such a height as to permit the draft which enters by the side perforations, 19, to pass up under the fire, the heat being forced through the perforations upon the reverse side into the heating-pipes, perforations 19 being arranged on a plane lower than the perforations 9 9.

The operation of my improved heater is as follows: It will be seen that the air will be admitted freely through the space formed by the peculiar construction of the top or cover of the outer casing or chamber, and passing down will fill the space between the inner side of said outer chamber and the side of the fire-box. It thence passes up and feeds the fire, the heat, smoke, &c., generated therefrom, passing into the heating-pipes and, finally, into the open air through the exit-pipe 11. In this manner the water contained in the heating compartment is thoroughly warmed, and, as above described, can then be transferred into the drinking-chamber by simply removing the cap from the faucet or discharge-pipe 4.

The advantages of this improved construction of heaters for watering-troughs are obvious. It will be seen that the water contained in the trough is effectually prevented from freezing even in the coldest weather, and should the heat from the fire-box become too intense, so as to make the water too warm or unfit for drinking purposes, the fire-box may be readily removed, but a minimum of labor being necessary.

The arrangement of the dampers enables me to effect automatically the opening and closing of the draft and heating openings or perforations, inasmuch as when the fire-box is placed within the outer casing or chamber the bent ends of the operating-rods engage the sides of said outer chamber and of course raise the dampers. When found necessary to remove the fire-box, the operating-rods are released from engagement, permitting the dampers to close, thus shutting off all draft and preventing a rush of air and consequent speedy extinguishment of the fire.

From the foregoing description, taken in connection with the accompanying drawings, the operation, construction, and advantages of my improved device for heating watering-troughs will be readily understood without requiring further explanation.

Having thus described my invention, I claim and desire to secure by Letters Patent of the United States—

1. The combination, with the fire-box having perforations on each side thereof, of the dampers having suitable operating-rods with bent ends, said dampers working in grooves or ways in the sides of the fire-box, their lower ends being supported by transverse flanges, as and for the purpose shown and set forth.

2. A heater for watering-troughs, consisting of the outer chamber or casing having suitable side perforations, the fire-box provided with suitable cover and having perforations on each side thereof, the dampers having suitable operating-rods provided with bent ends, said dampers working in grooves or ways in the sides of the fire-box, their lower ends being supported by transverse flanges, the removable grate, the heating-pipes, and the exit-pipe or vent.

3. The combination of the water receptacle or trough, consisting of the heating and drinking chambers, the faucet or discharge-pipe for transferring the water from one chamber to the other, and the improved heater herein shown and described, consisting of the inner and outer casings, each provided with registering perforations, the dampers, a system of heating-pipes terminating in an exit-pipe, and the cover for the outer casing, substantially as and for the purpose shown and set forth.

4. The combination, with the outer chamber or casing, of the cover having an upper angular flange or hood, forming an air passage or flue, substantially as and for the purpose shown and set forth.

In testimony whereof I affix my signature in presence of two witnesses.

DENNIS JOHN HADLEY.

Witnesses:
H. A. HATCH,
J. W. CHASE.